Nov. 3, 1925.
L. E. TAYLOR
1,560,437
PROCESS OF PRODUCING COLOR PICTURES
Filed June 19, 1923   2 Sheets-Sheet 1
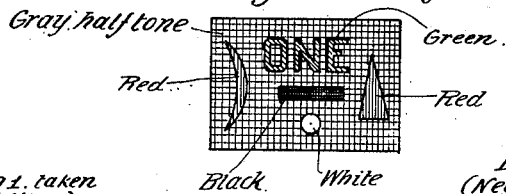
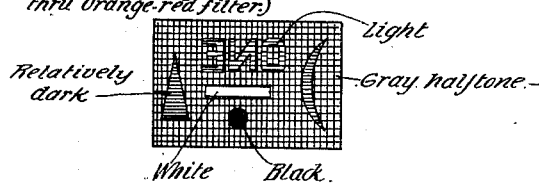
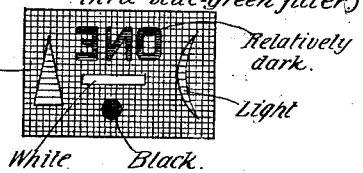
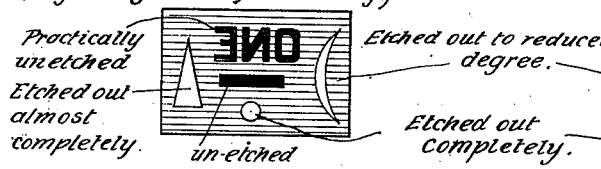
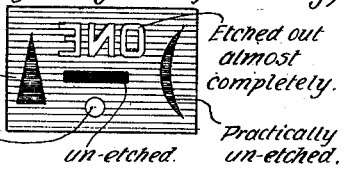
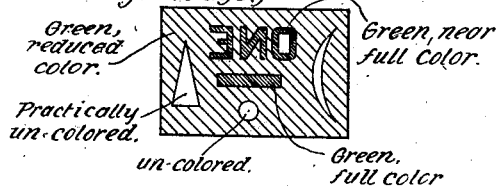
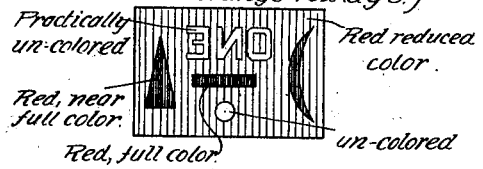
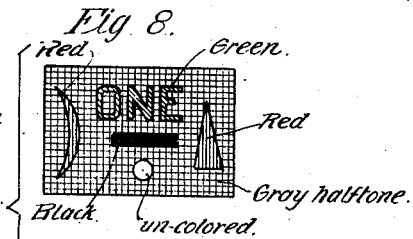
Inventor
Loren E. Taylor.
Attorney.

Nov. 3, 1925.
L. E. TAYLOR
1,560,437
PROCESS OF PRODUCING COLOR PICTURES
Filed June 19, 1923    2 Sheets-Sheet 2
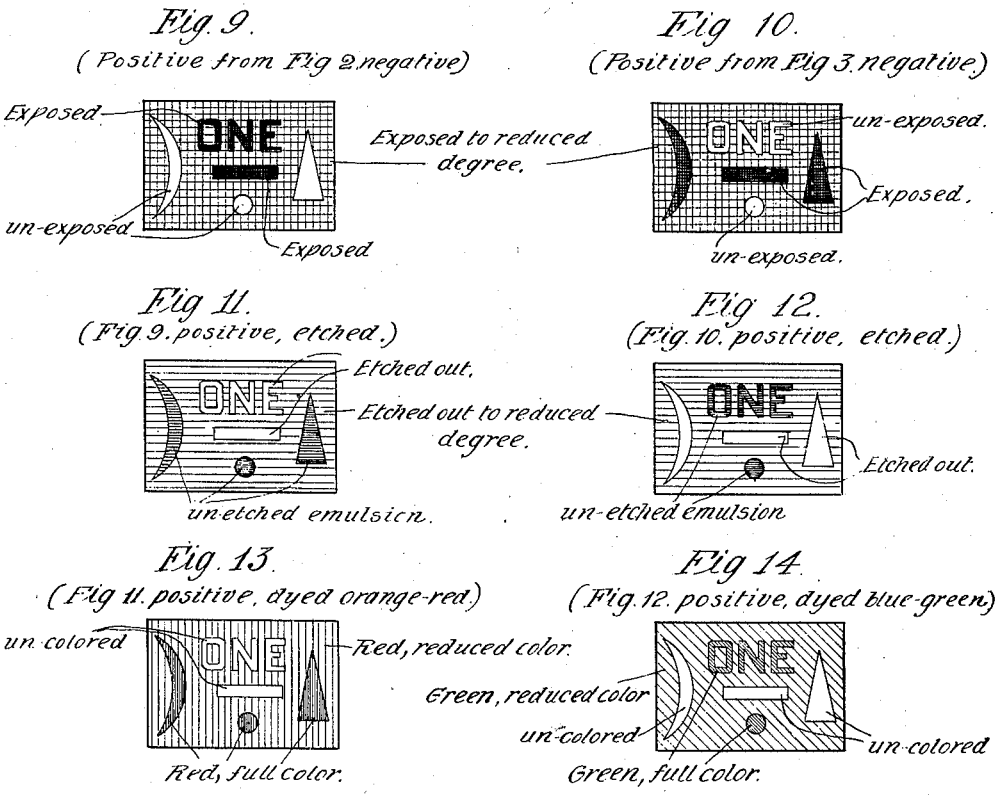
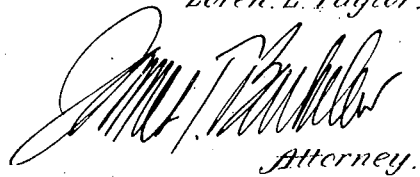
Inventor.
Loren. E. Taylor.
Attorney.

Patented Nov. 3, 1925.

1,560,437

UNITED STATES PATENT OFFICE.

LOREN E. TAYLOR, OF LOS ANGELES, CALIFORNIA, ASSIGNOR TO FAMOUS PLAYERS-LASKY CORPORATION, OF NEW YORK, N. Y., A CORPORATION OF NEW YORK.

PROCESS OF PRODUCING COLOR PICTURES.

Application filed June 19, 1923. Serial No. 646,471.

*To all whom it may concern:*

Be it known that I, LOREN E. TAYLOR, a citizen of the United States, residing in Los Angeles, county of Los Angeles, State of California, have invented new and useful Improvements in Processes of Producing Color Pictures, of which the following is a specification.

This invention has to do with a process of producing color pictures, and with a photographic film produced by the process. Although there are many objects of the invention, and they will be best understood from the following detailed explanation of the process itself, I may state at the outset that it is a general object of the invention to provide a color picture that can be made easily, quickly, and at small expense, and that will accurately and faithfully reproduce the original colors without any defects of color registration.

Fig. 1 is a view of a scene, parts of which are colored. It is illustrated as a title plate having a gray toned background, lettering in green, ornamental figures at the sides in red, a black, rectangular block below the lettering and a white spot beneath the black block;

Fig. 2 is a negative of the scene shown in Fig. 1 taken through an orange-red filter;

Fig. 3 is a negative of the scene shown in Fig. 1 taken through a blue-green filter;

Fig. 4 is a view of the negative shown in Fig. 2 after the exposed parts of the emulsion have been etched away in proportion to their exposure;

Fig. 5 is a view of the negative shown in Fig. 3 after the exposed parts of the emulsion have been etched away in proportion to their exposure;

Fig. 6 is a view of the negative shown in Fig. 4, showing the emulsion which was not etched away dyed blue-green;

Fig. 7 is a view of the negative shown in Fig. 5, showing the emulsion which was not etched away dyed orange-red;

Fig. 8 illustrates the negatives in Figs. 6 and 7 as being superposed with their corresponding images in register, the films being viewed from the backs thereof;

Fig. 9 is a view of a positive taken from the negative in Fig. 2;

Fig. 10 is a view of a positive taken from the negative in Fig. 3;

Fig. 11 is a view of the positive shown in Fig. 9 after the exposed parts of the emulsion have been etched away in proportion to their exposure;

Fig. 12 is a view of the positive shown in Fig. 10 after the exposed parts of the emulsion have been etched away in proportion to their exposure;

Fig. 13 is a view of the positive shown in Fig. 11, showing the emulsion which was not etched away dyed orange-red; and Fig. 14 is a view of the positive shown in Fig. 12, showing the emulsion which was not etched away dyed blue-green.

My process may be applied to either negatives or positives as will appear hereinafter; and it may also be applied to any suitable number of color separations. However, for the purposes of this specification, and for the sake of simplicity, I will assume that the original negatives are taken in double color separation by some suitable means, as by using sensitized elements that are predominantly sensitive to certain light colors or by using filtering means, or both. Thus, I will presuppose that two negatives are taken of the same scene, (Fig. 1) one (Fig. 2) by orange red light and the other (Fig. 3) by blue-green light. These two negatives are next developed in the usual manner so as to reduce the silver in the exposed parts. I next make positives and duplicate negatives for the next step of the process, so as to save the original camera negatives. It may in some cases be somewhat desirable to overdevelop the two negatives but this is not necessary. However, for simplicity of illustration, it will be assumed that the original camera negatives are the ones treated in the following manner.

The two negatives, (Figs. 2 and 3) thus developed, after drying, are next run through what I term the etching solution. The best solution I have so far found for this purpose is as follows:

64 fluid drams water,
64 fluid drams hydrogen peroxide of the standard commercial variety known as 10 vol. 3%.
120 grains cupric sulphate, and
2 minims sulphuric acid, or in place of the sulphuric acid 5 c. cm. of hydrochloric acid may be used.

A few minutes' treatment in this etching solution causes the particles of developed silver to be etched out of the emulsion or gelatin film and also causes the gelatin in immediate contact with each particle to be taken off the base (for instance, the celluloid base) along with the silver particles. Thus, where the silver has been exposed and developed so heavily as to practically make the film opaque, all or practically all of the gelatin layer is taken off the film. In other places where the silver has not been so heavily exposed and developed, as where there is a half-tone, the gelatin film is taken off correspondingly, being taken off in minutely small interspersed areas. After the etching is complete the two films are then dried and the remaining gelatin layer may be hardened if desired to prevent injury, although this hardening is not necessary or usually desirable at this stage of the procedure because the soft gelatin absorbs the subsequently applied dye better than the hardened gelatin.

At this stage of the procedure I then have a base with patches and areas of perfectly clear gelatin on it, these patches and areas corresponding to the parts of the negative that were not affected by the light of the color under which the negative was taken. Thus, when working in two color separation, generally speaking, the clear gelatin patches and areas that now remain (Fig. 5) on the negative that was taken through the blue-green filter, represent the red or orange red parts of the original scene; whereas the reverse is true of the clear gelatin parts that remain now (Fig. 4) on the negative that was taken through the orange red filter, those parts now representing the blue-green parts of the original scene.

Next, the two negatives are run through two dye-baths, the red record negative (the one that was originally taken through the blue-green filter) being run through a suitable red dye (Fig. 7); and the blue record negative (the one that was originally taken through the orange red filter) being run through a suitable blue green dye (Fig. 6). The exact colors of these dyes, and the length of time the negative should be allowed to remain in them, are matters largely of selection and depend upon the general coloring of the original subject, the general final result wanted, and the colors of the original filters. By proper dye color selection it is of course easy to reproduce the original colors with substantially perfect accuracy and faithfulness. On the other hand the dye colors may be so selected as to more or less emphasize either one or the other of the colors and give to the final picture any characteristic color tone desired.

Almost any dye solution may be used to dye these negatives. The only physical requisite of the solution, besides their proper color, is that they shall be capable of penetrating and adhering to the gelatin and not capable of penetrating or adhering to the clear celluloid; and almost any water soluble dye will do this. As an illustration of dyes that I use in practice, I may name amaranth red (described in Allen's Commercial Organic Analysis, 4th edition, vol. 5, page 150; as being a derivative from naphthionic acid and R salt) modified with tartrazine yellow (described in Allen's Commercial Organic Analysis, 4th edition, vol. 5, page 133; as being a derivative of pyrazolone) and malachite green (described in Allen's Commercial Organic Analysis, 4th edition, vol. 5, page 237, as being obtained by the oxidation of the tetramethyl-diaminotriphenylmethane which results from the condensation of the benzaldehyde with dimethylaniline), (a blue-green color).

After immersion in these dyes, the two films are next run through a clean water bath to carry off any dye that adheres to the clear celluloid, leaving the dye in the gelatin patches and areas. The films are then dried and may be hardened if desired. At this point it will be seen that I have changed the two original negatives into what amounts to color positives of the original scene; except of course that both images are reversed as to right and left, but this reversal is of course easily corrected by viewing the images from what was originally their front side. The red record film (Fig. 7) now carries red dye wherever there is anything red or reddish in the original scene; the blue record film (Fig. 6) carries dye wherever there is anything blue or bluish in the original scene. Wherever there is anything white in the original scene neither film will carry any color; wherever there is anything black in the original scene both films will carry full color. Wherever there is anything gray in the original scene both films will carry something less than full color. Thus when the two finished films are finally superposed (Fig. 8) in such a way as to transmit light subtractively, the original scene will be reproduced both as to color in all its graduations and as to black and white in all its graduations.

This superposition may be accomplished in a variety of manners. In the simplest form it may be accomplished by merely superposing the two films in registration. In the case of motion picture films the two films may be directly superposed or they may be run through a projection apparatus in such registering positions that they are in effect superposed. Or they may be superposed, in effect, by using these two thus prepared films as print plates to print their carried color onto another piece of film, which other piece of film may either be a piece of celluloid carrying clear gelatin on one or both surfaces to receive the transferred color, or may be a more or less heavily developed positive print. Thus, for instance, the two blue and red record films, after having been etched and prepared as described may be run through their two dye baths and then, while the color is still wet upon them, run successively into registering contact with a positive film of the same scene, printing the color onto that positive. In connection with this process it will be noted that the relief of the color carrying gelatin above the celluloid surface of the print plates materially helps in causing the color printing to be done only at the areas desired, and this without the necessity of running the two print plates through rinsing water before running them into contact with the positive to be printed.

This printing may take place either on one side of a positive film or on both sides of a positive film; and in the last mentioned case that positive film may be doubled coated positive.

On the other hand a double coated positive may be produced by this general process, without color printing. For instance, the two original negatives may be originally made on opposite sides of a piece of double coated film; this being done in any of several well-known manners. This operation, as well as some of the printing operations above described, requires reversal as to right and left of one of the images, and this may be accomplished in any of the several well-known manners. For instance, cameras have been devised that reverse one of the images as to right and left. Or, where two separate negatives are taken without reversal, one of them may be reversed by the simple expedient of reverse printing.

In a case where the two negatives are originally made on opposite sides of a double coated film, the two negatives are then etched in the manner above described, and then the colors may be separately applied directly to the two etched gelatin surfaces in manners well-known in the art.

The foregoing description deals with the coloring of a film that was originally a negative. The same etching and color process may be applied to positives. For instance, from the negative (Fig. 2) that was exposed through the red filter I make a positive (Fig. 9) and likewise from the negative (Fig. 3) that was exposed through the blue filter I make a positive (Fig. 10). These positives are then developed; and they then have clear portions corresponding to the parts of the original scene that were colored in the color of the corresponding filter. These positives are then etched (Figs. 11 and 12) as before described, leaving all the clear gelatin only in those parts that correspond to the filter color in the original scene. Thus, the red positive (Fig. 11), when dyed with red dye (Fig. 13), will carry that red dye at areas, and in proportion, corresponding to red or reddish objects in the original scene; while the blue positive (Fig. 12), when dyed with blue dye (Fig. 14) will be blue in the areas and in proportion corresponding to the blue or bluish parts of the original scene. In this characteristic they are just like the previously described colored negatives. But they differ from the colored negatives in this: that whereas neither of the colored negatives carry any color in parts that were white in the original scene, these colored positives both carry color in parts corresponding to original scene white; and whereas the colored negatives both carry color in parts corresponding to black or gray in the original scene, these colored positives carry no color in parts corresponding to original scene black, and both carry only reduced color in parts corresponding to original scene gray. Consequently, these colored positives are not finally used to transmit color by subtraction but are used to produce their final color effect by addition. For instance, they may be used by simultaneously projecting them onto a screen, together with a projection of a black and white positive onto that screen. Also they may be used as printing plates to print their color onto another film or any suitable base, transparent or opaque, the two colors being in this case, printed onto the film in such a way that where the two colors are printed onto the same area, they mix so as to finally transmit or reflect color by addition rather than subtraction. This may easily be done by having the first applied color still moist when the second applied color is printed; whereas in using the negatives as print plates, in order to get subtractive results, the first applied color is dry enough that it will not mix with the second applied color when that is applied but the two color printings will remain in distinct layers of films.

This application is, in part, a continuation of my application, Serial No. 418,040, filed October 19, 1920, process of producing color pictures.

I claim:

1. The process of treating an exposed and developed film, that involves etching out from it the exposed portions by submitting it to the action of a solution containing hydrogen peroxide, cupric sulphate and an acid.

2. A process of producing color pictures that involves submitting an exposed and developed film to the action of a solution containing hydrogen peroxide, cupric sulphate, and an acid, and thereby etching out from the film those portions which have been exposed and developed, leaving the remaining portions of the emulsion or gelatin upon the film, and then applying color to the said remaining portions.

3. The described method of treating a double coated film to produce color pictures, that includes selectively exposing the two actinic coatings of the film to light of different colors, developing the film, etching out the exposed and developed portions of the two coatings, and selectively coloring the remaining portions of the coatings with different colors.

In witness that I claim the foregoing I have hereunto subscribed my name this 8th day of June 1923.

LOREN E. TAYLOR.